United States Patent

Cleary

[15] 3,665,056
[45] May 23, 1972

[54] CYCLOHEXYLENE POLYESTER DYE RECEPTORS

[72] Inventor: James W. Cleary, Bartlesville, Okla.
[73] Assignee: Phillips Petroleum Company
[22] Filed: Aug. 3, 1970
[21] Appl. No.: 60,611

[52] U.S. Cl. .............................. 260/873, 8/162 R, 8/DIG. 9
[51] Int. Cl. ....................................... C08g 39/10, D06p 3/00
[58] Field of Search ............................... 260/873; 8/DIG. 9

[56] References Cited

UNITED STATES PATENTS 3,223,752  12/1965  Tate et al. ........................... 260/873
3,431,322  3/1969  Caldwell et al. ..................... 260/873
3,312,755  4/1967  Cappuccio et al. .................. 260/873

Primary Examiner—William H. Short
Assistant Examiner—Edward Woodberry
Attorney—Young and Quigg

[57] ABSTRACT

A process for dyeing polyolefins in which there is incorporated in the polyolefin a polyester formed as the reaction product of 1,4-cyclohexanediol and a paraffinic dicarboxylic acid.

9 Claims, No Drawings

CYCLOHEXYLENE POLYESTER DYE RECEPTORS

This invention relates to cyclohexylene polyester additives to polyolefins to improve dyeability thereof.

In one of its more specific aspects, this invention relates to the use of cyclohexylene polyesters of paraffin diacids as additives in polyolefins to render the latter more readily dyeable.

The difficulty of imparting color to polyolefins is well known. This invention is directed to the solution of that problem.

According to this invention there is provided a process for dyeing polyolefins which comprises incorporating in the polyolefin the ester formed as the reaction product of 1,4-cyclohexanediol and a paraffinic dicarboxylic acid having from 4 to about 6 carbon atoms and dyeing the resulting polyolefin/polyester. Particularly suitable dicarboxylic acids include adipic acid, glutaric acid and succinic acid.

The additives of this invention can be incorporated into any of the polyolefin resins, these including polyethylene and polypropylene. This incorporation can be made into the polyolefin in any of its forms including sheets and fibers. The effect of these additives will be illustrated herein by incorporation in polypropylene fibers without meaning to limit the invention thereto.

The polyesters employed in this invention are the condensation products of 1,4-cyclohexanediol and the dicarboxylic acid. These polyesters are prepared by methods known in the art, with the polyesters having the general formula

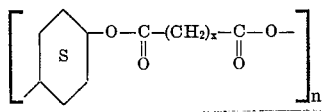

wherein $x$ has a value from 2 to 4, inclusive, and $n$ has a value greater than 10 but less than 100.

The cyclohexylene polyesters are incorporated in the polyolefin in an amount from about 1 to about 35 weight percent of the weight of the polyolefinic material. Mixtures of the polyesters can be employed.

The polyester composition is incorporated in the polyolefin by any of the conventional methods presently employed for incorporating such additives in polyolefins. In this respect, that polyester derived from succinic acid has a melting point approximately that of polypropylene, that is, about 160° C., and hence its incorporation is easily effected and undesirably high temperatures, which can be deleterious to the polypropylene, are not required during its processing in order to maintain the additive in a molten and dispersed condition.

The following illustrate the use of the cyclohexylene polyesters of this invention in producing readily dyeable blends. In all instances, commercially available dyes and conventionally-used dyeing techniques were employed.

EXAMPLE I

Samples of identical unmodified polypropylenes containing only the usual ultraviolet light stabilizers and antioxidants were identically dyed with three commercial dyes. Into Sample II, the succinate polyester of 1,4-cyclohexanediol was incorporated in the amount of 10 percent by weight of the polypropylene. According to this invention, Sample I contained no additive to improve its dyeability.

SAMPLE I

| Dye | Color Yield (K/S) | Dry Cleaning | Light Fastness |
|---|---|---|---|
| Genacron Blue | 3.1 | 0 | 2/5 |
| Polydye Red | 2.6 | 0 | 2/5 |
| Calsocyn Yellow | 1.3 | 0 | 2/5 |

SAMPLE II

| Dye | Color Yield (K/S) | Dry Cleaning | Light Fastness |
|---|---|---|---|
| Genacron Blue | 5.79 | 2 | 5/40 |
| Polydye Red | ** 12.53 | 1-2 | 5/40 |
| Calsocyn Yellow | 19.01 | 1 | 6/80 |

In the test results, K/S = $(1-R)^2/2R$, "R" being the reflectance measured on an Instrument Development Laboratory Model D-1 Color Eye, this measurement being made at the wave length of maximum absorption. The higher the K/S value, the better the color yield.

The dry cleaning test is made according to AATCC Method 85-1963. The higher the dry cleaning value, the more acceptable is the color fastness during dry cleaning.

Light fastness is measured by AATCC Method 16E -64T, using a Standard Blue Wool sample for comparison. The higher the value, the better the light fastness.

These results indicate that the polyester of succinic acid and 1,4-cyclohexanediol is an effective additive to polyolefins to form a more readily dyeable composition.

EXAMPLE II

Two polyesters, one the derivative of 1,4-cyclohexanediol and adipic acid (CHA) and one the derivative of 1,4-cyclohexanediol and succinic acid (CHS) were blended into polypropylene at a concentration level of 10 percent. The polypropylene was then dyed with commercial dyes and color yield and light fastness of the resulting blend were determined.

In each instance, the polyester was incorporated in the polypropylene in the amount of 10 php of polypropylene.

Results were as follows:

| Dye Concentration | Calsocyn Yellow 0.1 | GN 2.0 | Polydye Rev. 0.1 | BL 2.0 | Genacron Blue 0.1 | GR 2.0 |
|---|---|---|---|---|---|---|
| Color Yield | | | | | | |
| CHA | 1.42 | 7.36 | 0.48 | 12.91 | 0.36 | 6.18 |
| CHS | 0.95 | 19.01 | 0.53 | 12.53 | 0.41 | 5.79 |
| Light Fastness | | | | | | |
| CHA | 4/20 | 6/80 | 3/20 | 4/20 | 3/20 | 4/20 |
| CHS | 5/40 | 6/80 | 4/20 | 5/40 | 5/40 | 5/40 |

The above data indicate that the polyesters of the subject invention are effective even at low levels of dye concentrations.

It will be evident from the foregoing examples, and particularly that of Sample II which illustrates the best mode of the invention, that various modifications can be made to this invention. Such, however, are considered as being within the scope of the invention.

What is claimed is:

1. A method of dyeing polyolefins which comprises incorporating in said polyolefin a polyester in an amount within the range of from about 1 to about 35 weight percent of said polyolefin, said polyester being the reaction product of 1,4-cyclohexanediol with a paraffinic dicarboxylic acid having four to six carbon atoms and dyeing said polyolefin containing said polyester.

2. The method as defined in claim 1 in which said polyester has the formula

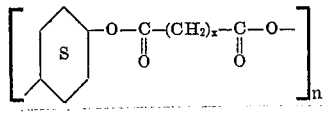

wherein $x$ has a value from 2 to 4, inclusive, and $n$ has a value greater than 10 but less than 100.

3. The method as defined in claim 1 in which said dicarboxylic acid is selected from the group consisting of adipic acid, glutaric acid and succinic acid.

4. The method as defined in claim 1 in which said polyolefin is selected from the group consisting of polyethylene and polypropylene.

5. The method as defined in claim 1 in which the succinate polyester of 1,4-cyclohexanediol is incorporated in polypropylene in the amount of 10 percent by weight of said polypropylene.

6. A blend comprising a polyolefin and from about 1 to about 35 weight percent of said polyolefin of the polyester defined in claim 2.

7. A blend according to claim 6, said blend comprising polypropylene and the succinate polyester reaction product of succinic acid and 1,4-cyclohexanediol.

8. A blend according to claim 7, said blend comprising polypropylene and the adipic polyester reaction product of adipic acid and 1,4-cyclohexanediol.

9. A blend according to claim 7, said blend comprising polypropylene and the glutaric polyester reaction product of glutaric acid and 1,4-cyclohexanediol.

* * * * *